United States Patent
Pitts

[15] 3,695,557
[45] Oct. 3, 1972

[54] BIPLANE CONSTRUCTION

[72] Inventor: Curtis H. Pitts, P.O. Box 548, Homestead, Fla. 33030

[22] Filed: Aug. 28, 1970

[21] Appl. No.: 67,847

[52] U.S. Cl. ............................................. 244/45 R
[51] Int. Cl. ............................................. B64c 3/06
[58] Field of Search .................... 244/45, 40, 35

[56] References Cited

UNITED STATES PATENTS

| 1,802,283 | 4/1931 | Simmonds | 244/40 R |
| 3,259,342 | 7/1966 | Kessery | 244/45 R |

OTHER PUBLICATIONS

Janes, All The Worlds Aircraft, Sampson–Low Publishing Co., 1939, pages 221c & 237c

*Primary Examiner*—Milton Buchler
*Assistant Examiner*—Carl A. Rutledge
*Attorney*—Clarence A. O'Brien and Harvey B. Jacobson

[57] ABSTRACT

The design of the wings of a biplane wherein the inverted flight characteristics are more nearly equal to normal flight characteristics by use of essentially symmetrical airfoils which have substantially the same relationships between lift and angle of attack inverted as they do right side up. This invention achieves desired stability characteristics in the pitching mode both inverted and right side up by properly designing an essentially symmetrical airfoil forward wing having different aerodynamic characteristics from the essentially symmetrical airfoil rearward wing thereby attaining the desirable flight characteristics.

4 Claims, 4 Drawing Figures

PATENTED OCT 3 1972 3,695,557

Curtis H. Pitts
INVENTOR.

BY Clarence A. O'Brien
and Harvey B. Jacobson
Attorneys

Curtis H. Pitts
INVENTOR.

BY Clarence A. O'Brien
and Harvey B. Jacobson
Attorneys

BIPLANE CONSTRUCTION

The primary object of this invention is to obtain comparable inverted and normal flight characteristics in a biplane for aerobatic flying and, at the same time, to retain and improve the stability and safety characteristics of said plane.

In order to test his invention applicant has flown a plane fabricated in compliance with the disclosure in this application with excellent results, and has accumulated a great deal of aerodynamic data including basic load reports, flutter evaluation reports, drop test proposal, and static test proposal reports and this aircraft has proven to be a very practical and excellent aircraft. Biplanes are old, however the configuration of the wings in the past had not developed to the state that enables normal and inverted flights to be equally stable and safe. In general, biplanes are extremely more dangerous in the inverted flight position than in the normal flight position. This invention creates a condition wherein both inverted and normal flights approach each other as far as safety is concerned with the inverted flight being as safe as most biplanes when flown in a normal flight position.

SUMMARY AND OBJECTS OF INVENTION

The general use of unsymmetrical wing sections in a biplane is to produce more lift in positive flight than in negative flight, therefore it is apparent that negative flight performance suffers greatly as compared to positive flight performance. An object accomplished by having essentially symmetrical wing sections is the fact that the lifting characteristics from the right side up attitude is the same as the lifting characteristics of upside down flight. It is therefore apparent that negative flight performance can be almost identical to positive flight performance by employing essentially symmetrical wing sections.

By using a set of essentially symmetrical wing sections having the same or different aerodynamic characteristics, the forward and rearward wings may be designed to create strong pitch stability forces. By selecting an essentially symmetrical wing section for the forward wing it will have in flight a steeper slope to its lift curve than the rearward wing, with the result that any increase in speed causes the lift of the forward wing to increase at a greater rate than the rearward wing, producing a nose-up moment which in turn causes the speed to decrease and the aircraft to be restored to steady flight at its original trim speed. Decrease in speed similarly produces restoring forces thereby creating a more stable flight. Another essential advantage seen in the invention is that if the forward wing stalls at 15° for example, and the rearward wing will not stall until 18° of attack with both wings mounted on the aircraft at near the same angle, it is clear that the forward wing must stall and lose its lift 3° earlier than the rearward wing. This loss of lift to the forward wing before the rearward wing causes the nose to pitch down and flying speed is regained for recovery from the stall. These same conditions hold true for negative flight. This is a great advantage because the proper design and selection of the almost symmetrical airfoils creates a condition where stalling is only a momentary activity and the plane is put back into its more stable flight pattern by the fact that the stall angle is different between forward and rearward wings.

The foregoing objects together with other objects and advantages which will become subsequently apparent reside in the details of the construction and operation as more fully hereinafter described and claimed, reference being had to the accompanying drawings forming a part hereof, wherein like numerals refer to like parts throughout.

Figure 1:
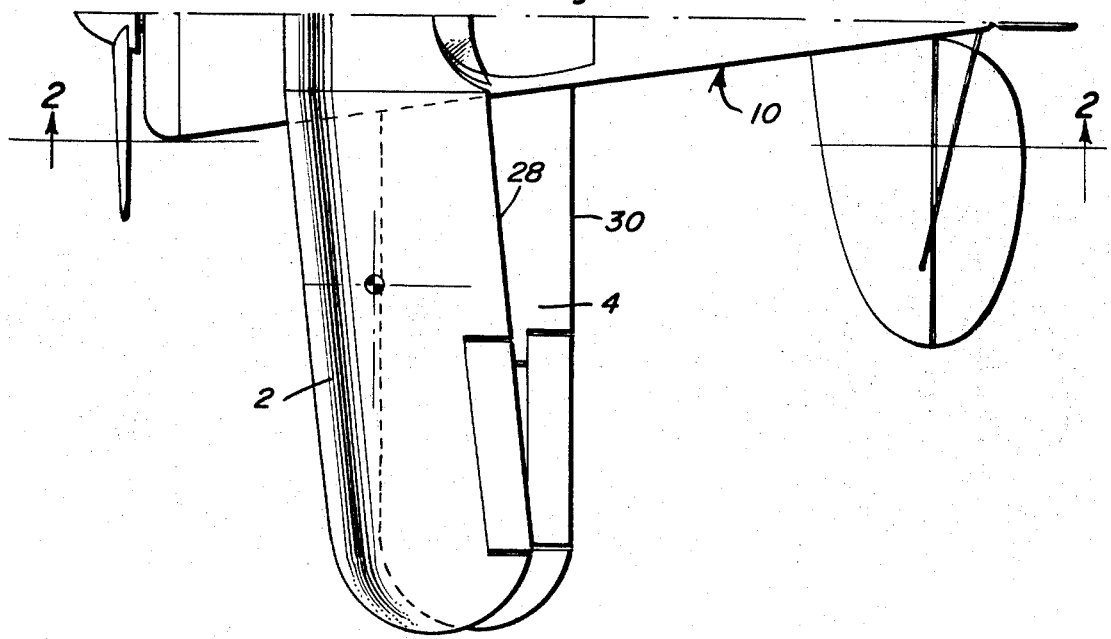
FIG. 1 is a plan view of one half of the biplane.

Referring to the drawings, a biplane generally indicated as 10 includes the usual conventional fuselage, motor, propeller, tail assembly and landing gear. The biplane 10 includes a pair of wings 2 and 4 each of which is a substantially symmetrical airfoil having aerodynamic centers at 22 and 24, respectively. The wings are supported from the fuselage in a conventional manner with wing 2 being supported above the fuselage by members 6, 8, and 14 in general with main supporting strut member 18.

Figure 2:
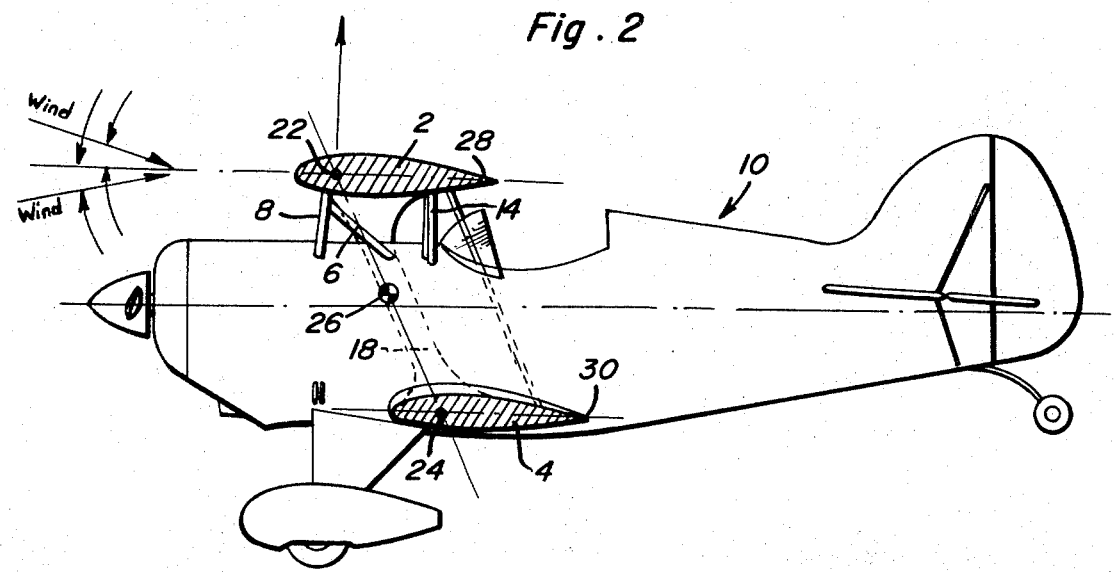
FIG. 2 is a side elevation of the aircraft.
Figure 3:
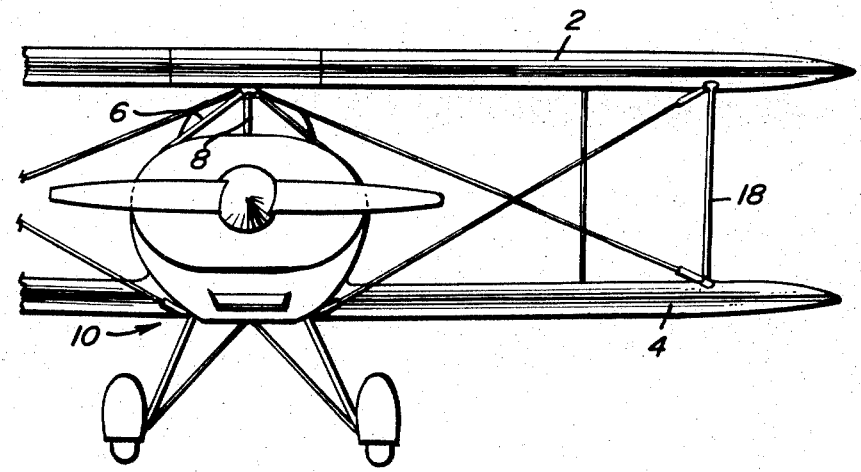
FIG. 3 is a partial front view of the aircraft.

Reference to FIG. 2 will indicate the forward wing 2 and rearward wing 4 are essentially symmetrical and elongated in teardrop configurations with the rounded portion of the teardrop in the forward position of both wings and the opposite end of the wing terminating in a point as at 28 and 30, respectively. It is important to note that the wings are arranged with one above the other by a distance corresponding to the length of the main support member 18, wing 2 being forward of wing 4 therefore being called the forward wing with wing 4 being the rearward wing. This designation should avoid confusing the wings when the aircraft is inverted as it is better to label the wings as rearward and forward rather than top and bottom because this plane is designed to fly both in the normal and upside down orientations.

The plane when flying right side up or in its normal attitude, has the two wings essentially parallel to each other thus performing as a normal biplane. Since the essentially symmetrical wing sections are virtually identical on the top side and bottom side, the aerodynamic characteristics are the same when lifting from right side up, that is normal flight, as when lifting from upside-down. It is therefore apparent that negative flight performance can be made almost identical to positive flight performance by employing these essentially symmetrical wing sections wherein the forward wing is of the same or slightly different dimensional characteristics than is the rearward wing. When the forward wing is designed so as to obtain a steeper slope to the lift curve than the rearward wing, any increase in the speed causes the lift of the forward wing to increase at a greater rate than the rearward wing, producing a nose-up moment which in turn causes the speed to decrease and the aircraft to be restored to steady flight at its original trim speed. Decrease in the speed similarly produces restoring forces. Since there is no geometric or aerodynamic twist in the wings and they are mounted on the airframe near the same zero lift angle, and since the wings are essentially symmetrical, these same conditions will hold relatively in negative flight. An example of how this configuration is beneficial is as follows. Assuming the forward wing stalls and loses the greater portion of its lift at 15° angle of attack, and the same thing does not happen to the rearward wing for another 3°, it is then clear that the forward wing must stall at 15° angle of attack and lose its lift 3° earlier or a short period of time earlier than the loss of lift to the rearward wing. This being the case, the nose of the plane would pitch down and flying speed would be regained for recovery from the stall. Conversely, these same conditions would hold true for negative flight. Therefore the essence of the invention is the concept of designing the two wings with essentially symmetrical airfoil sections. All of the favorable conditions can be accomplished in a biplane by the proper selection of the geometry and angulation of the essentially symmetrical wings.

Figure 4:
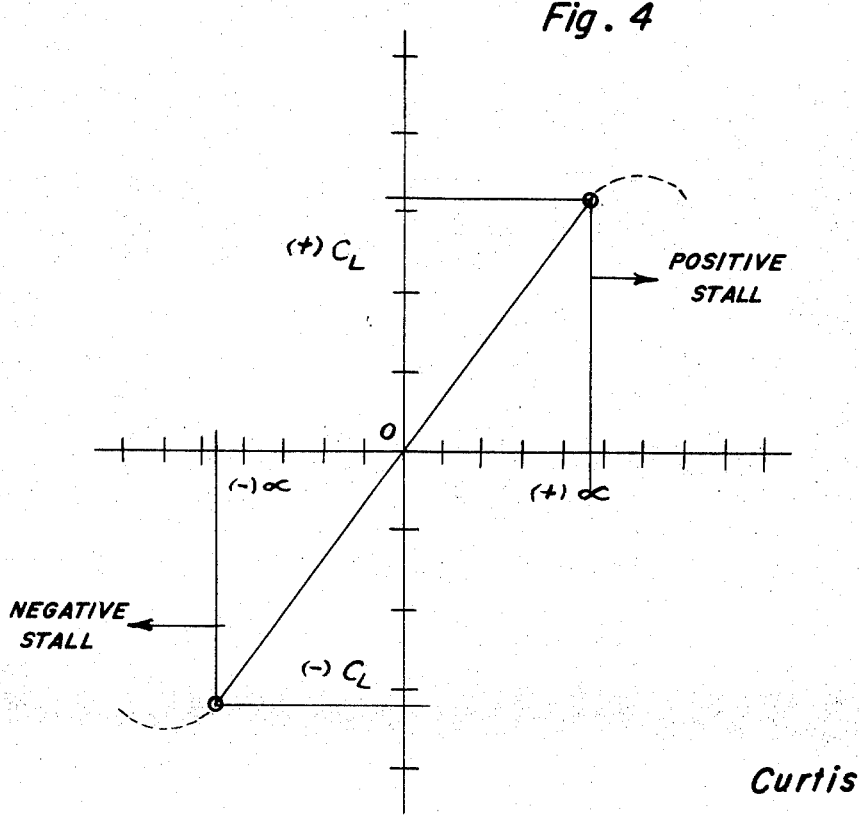
FIG. 4 is a graph illustrating the relationship of wind angle to lift.

FIG. 2 illustrates the point 26 as the resultant aerodynamic center of the forward and rearward wings. The aerodynamic centers are also the effective centers of airloading. FIG. 4 illustrates graphically the relationship of wing lift force to angle of relative wind for essentially symmetrical airfoil wings with it being noted that +CL is numerically equal to −CL when the positive wind angle is numerically equal to the negative wind angle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an aircraft of the type having multiple wings and adapted for use in positive, right side up flight attitude, that improvement comprising each wing being substantially symmetrical both above and below a plane extending from the leading edge to the trailing edge thereof to provide substantially the same flight characteristics in both flight attitudes, one wing being disposed forwardly of the other, the forwardly disposed wing having aerodynamic characteristics different from the rearward wing by virtue of their aerodynamic interaction with each other, the forward wing including a steeper slope to the lift curve than the rearward wing, whereby any increase in speed causes the lift of the forward wing to increase at a greater rate than the rearward wing thereby producing a nose-up moment which causes the speed to decrease and the aircraft to be restored to steady flight at its original speed, said steeper slope to the lift curve on the forward wing causing similar restoring forces when speed decreases, the forward wing being constructed with a configuration which stalls at a lesser angle of attack than the rearward wing which causes the forward wing to stall and lose its lift prior to the rearward wing thereby causing the nose to pitch down and flying speed to be regained for recovery from the stall in either positive or negative flight attitude.

2. A biplane as in claim 1 wherein the two essentially symmetrically shaped wings are not necessarily but may be identically shaped with each other.

3. A biplane as in claim 2 wherein the two essentially symmetrically shaped airfoil sections are horizontal teardrop shapes with the point of the teardrops being extended to the rearward portion of the airfoils.

4. In an aircraft of the type having a pair of wing means arranged one above the other for use in positive, right side up flight attitude, the improvement wherein each wing means is substantially symmetrical both above and below a plane extending from the leading edge to the trailing edge thereof for providing substantially the same flight characteristics in both normal and inverted flight attitudes, the wing means uppermost in normal flight attitude disposed forwardly of the other wing means and having aerodynamic characteristics different from the other, rearward wing means by virtue of their aerodynamic interaction with each other, said forward wing means provided with a steeper slope means to the lift curve than the rearward wing for causing the lift of the forward wing means to increase with an increase in speed at a greater rate than the rearward wing for producing a nose-up moment causing the speed to decrease and the aircraft to be restored to steady flight at its original speed, and for causing similar restoring forces when speed decreases, and wherein said forward wing means is constructed in a configuration which stalls at a lesser angle of attack than said rearward wing means for causing said forward wing means to stall and lose its lift prior to the rearward wing means for causing the nose to pitch down and flying speed to be regained for recovery from the stall in both normal and inverted flight attitudes.

* * * * *